United States Patent [19]
Wendelbo

[11] Patent Number: 5,976,490
[45] Date of Patent: Nov. 2, 1999

[54] ZEOLITE CONTAINING CATION EXCHANGERS METHODS FOR PREPARATION AND USE

[75] Inventor: Rune Wendelbo, Oslo, Norway

[73] Assignee: Norsk Leca AS, Oslo, Norway

[21] Appl. No.: 09/000,335

[22] PCT Filed: Jun. 26, 1997

[86] PCT No.: PCT/NO97/00166

§ 371 Date: May 26, 1998

§ 102(e) Date: May 26, 1998

[87] PCT Pub. No.: WO97/49486

PCT Pub. Date: Dec. 31, 1997

[30] Foreign Application Priority Data

Jun. 27, 1996 [NO] Norway ................................. 962726

[51] Int. Cl.⁶ ........................... C01B 39/02; B01J 20/10
[52] U.S. Cl. ..................... 423/712; 423/716; 502/68
[58] Field of Search ................ 502/68; 423/712, 423/716

[56] References Cited

U.S. PATENT DOCUMENTS

| | | |
|---|---|---|
| 3,008,803 | 11/1961 | Milton . |
| 3,058,805 | 10/1962 | Weber . |
| 3,065,054 | 11/1962 | Haden, Jr. et al. ...................... 423/712 |
| 3,647,718 | 3/1972 | Haden, Jr. et al. ....................... 502/68 |
| 3,649,178 | 3/1972 | Wang et al. . |
| 4,058,586 | 11/1977 | Chi et al. ................................ 423/712 |
| 4,344,851 | 8/1982 | Sherman et al. . |
| 4,522,727 | 6/1985 | Weber . |
| 4,818,508 | 4/1989 | Flank et al. ............................ 423/712 |
| 4,891,200 | 1/1990 | Fajula et al. . |
| 4,980,323 | 12/1990 | Bedard et al. . |
| 5,023,220 | 6/1991 | Dight et al. ............................. 502/68 |
| 5,064,790 | 11/1991 | Bedard et al. . |
| 5,169,825 | 12/1992 | Okubo et al. . |
| 5,179,051 | 1/1993 | Bedard et al. . |
| 5,451,391 | 9/1995 | DiRenzo et al. . |
| 5,470,557 | 11/1995 | Garney . |
| 5,552,129 | 9/1996 | Farnos et al. ........................ 423/239.2 |
| 5,558,851 | 9/1996 | Miller ..................................... 423/702 |

FOREIGN PATENT DOCUMENTS

WO 96/18577  6/1996  WIPO .

OTHER PUBLICATIONS

Meier et al., Atlas of Zeolite Structure Types, pp. 100–101, 1992.

Primary Examiner—Mark L. Bell
Assistant Examiner—David Sample
Attorney, Agent, or Firm—Dickinson Wright PLLC

[57] ABSTRACT

The present invention concerns zeolitic cation exchangers consisting of expanded ceramic, zeolitic pellets with macro- and microporosity, in the form of sintered, light, expanded clay aggregates which are partly transformed to zeolite by means of hydrothermal treatment with an alkaline solution for a period of at least 2 hours at a temperature of between 50 and 300 degrees C. The invention also concerns a procedure for producing said cation exchangers, and applications of the same as ion exchangers and adsorbents.

3 Claims, 1 Drawing Sheet

ZEOLITE CONTAINING CATION EXCHANGERS METHODS FOR PREPARATION AND USE

This invention relates to expanded ceramic zeolitic particles which comprise various zeolitic cation exchangers with the common property that they consist of macroporous, 0.1–10 mm ceramic aggregates containing zeolite as an active component, and the application of said aggregates primarily in connection with water purification, e.g., removal of ammonium and heavy metals.

Zeolite is in its original form a class of naturally occurring silicate minerals which have the property of being microporous. The pores form a continuous network through the structure, and are most often saturated with water which evaporates when heated. The name "zeolite" means "boiling rock," suggesting that very property. Approx. 50 different zeolites are found in nature, but only 5 or 6 of these occur in commercial quantities. In addition, approx. 50 structures have been synthetically produced, but only a few of those have had any industrial significance. In all, there are about 10 different structures which will be assessed in connection with applications where requirements are set for a relatively low price, i.e. less than NOK 10,000/tonne.

Microporosity is the most interesting and unique property of zeolite. Zeolite pores run through the structure, frequently forming a 3-dimensional network throughout the zeolite crystal. Because the pores are so small the zeolite will typically have one pore opening per $nm^2$ of surface area, i.e. $10^{18}$ pore openings per $m^2$ of surface area. Consequently, the combined length of all the pores in one kilo of zeolite will typically be $10^{12}$ km, which corresponds to 25 million times around the earth. For many zeolites there is only one well-defined pore diameter, making them well-suited for gas separation, in that only molecules that are smaller than the pore opening are allowed into the zeolite's pore system.

Another very important property shared by many zeolites is the cation-exchange capacity. That is because the zeolite's lattice is negatively charged, and this negative charge is compensated by free cations in the pores. These free cations can be exchanged with other cations, and in many cases with hydronium ions. Zeolite on $H^+$ form has highly acidic properties, and some of those $H^-$ zeolites have had major significance as catalysts in industry, particularly in catalytic cracking of oil to gasoline. Furthermore, A-zeolite on $Na^+$ form is used in detergents where it acts as a softener by capturing $Mg^{2+}$ and $Ca^{2+}$, and releasing $Na^+$. The same zeolite is also used in air separation. In water purification the cation-exchanger properties are used to remove particularly $NH_4^+$ and heavy metals. Zeolites are also used as feed additives, dehydrating agents, soil-enhancement agents, substrates for yeast and bacteria, etc.

It is known from the literature, e.g., U.S. Pat. No. 5,451,391 and U.S. Pat. No. 4,891,200, that zeolite can be produced on the basis of raw materials containing oxides or other compounds of silicon and aluminum through their reaction with a relatively concentrated alkaline solution over a sufficiently long period, usually 6 hours to 1 month, and at a sufficiently high temperature, usually >70° C. It will often be unfavorable to have substances other than Si oxide, Al oxide, water and alkali present, but selected other substances can also serve to steer the synthesis in the direction of specific products. It is also known that raw materials for producing zeolite may comprise clay, e.g., kaolin which consists of $SiO_2$ and $Al_2O_3$ at a 2-to-1 ratio. When this material reacts with alkali, for example at 100° C. zeolite A can be produced. An example of such production of zeolite-A is given in U.S. Pat. No. 3,058,805. One type of zeolite can also be recrystallized into a different type of zeolite through hydrothermal treatment, e.g., as shown in U.S. Pat. No. 5,451,391 where Y zeolite is recrystallized to mazzite zeolite. However, in this and other methods for producing zeolite the product is obtained in powder form, often with crystals with a size of around 1 micrometer. The mazzite crystals produced in said U.S. Pat. No. 5,451,391 thus have a size ranging from 1 to 1.5 micrometers. Similarly, zeolite Omega produced according U.S. Pat. No. 4,891,200, example 5, has particles measuring 0.1×0.5×5 micrometers consisting of single crystals, while in the same patent, example 1, a method is given for producing the same zeolite in the form of spherical aggregates with a large number of individual crystals in each, so that the aggregates' diameter is approx. 1 micrometer, while the individual crystals have a diameter of about 0.1 micrometer.

Another known method includes a description in U.S. Pat. No. 3,649,178 of the manufacture of zeolite W-Z, and in U.S. Pat. No. 3,008,803 a description of how zeolite B can be produced through crystallization in alkaline solution, and it is also clear that zeolite B has many similarities to the zeolite gismondine.

Most patent literature concerning methods and processes for producing. zeolite has a number of features in common, being that one starts with raw materials containing silica, alumina and alkali (usually NaOH) and water. Moreover, heat treatment is always necessary for achieving crystallization within a reasonable time perspective, and finally that the aim is most often to produce a catalyst, adsorbent or cation exchanger. This does not prevent compounds belonging to this family of materials produced basically in a similar way, although with new and useful properties from being patented.

It is also known that non-zeolitic, inorganic ion exchangers are produced in a similar way and from similar raw materials as the zeolite-based ion exchangers. EP A 476 135 describes a process for producing an adsorbent for ammonium based on silica and alumina, and it is possible that the product is zeolitic, judging from the producing method. On the other hand, WO 96/18577 describes a product group called "ASD" (amorphous alumino-silicate derivative) and a method of producing such materials which are definitely "non-zeolitic." As the name implies, this product is amorphous, more specifically an X-ray-amorphous powder. What is demonstrated in the eight examples in WO-96/18577 concerning the manufacture of ASD materials is that a number of crystalline, natural minerals (including natural zeolite) are treated with alkali so that the original structure is destroyed, resulting in the formation of amorphous materials which are then dehydrated The other examples in WO-96/18577 concern these ASD materials used as ion exchangers and as absorbents for oil. WO-96/18577 also concerns methods for producing an amorphous product, characterized by starting with crystalline, natural minerals containing silica and alumina and treating them with alkali and water at a minimum of 8° C. This is also generally a common feature of most methods for producing zeolite, and in some cases (not unexpectedly) traces of the zeolite sodalite was obtained as a by-product, but then in the form of a powder.

Still another class of inorganic ion exchangers is the natural clays such as illite, smectite, kaolin, vermiculite, etc.

The present invention is different from known methods in that the original material is preferably expanded clay made from marine clay in a process where the clay is fed into a rotary kiln where it is first dried, crushed and finally expanded at temperatures rising to approx. 1,200° C. in the kiln's fire zone, yielding a virtually spherical granulate with a tight ceramic shell around a porous core. The use of ceramic particles in the form of sintered, light, expanded clay aggregates produced from marine clay as the starting material, yields as a product zeolites other than what is produced using, e.g., kaolin or metakaolin as raw material. Most importantly, however, is that it yields a product consisting of relatively light and large aggregates consisting of zeolite and unreacted ceramic material, and the product thus has the expanded clay's macroporisity and mechanical strength combined with the zeolite's microporous structure and high ion-exchange capacity. The remaining unreacted material gives the expanded ceramic zeolitic aggregates mechanical strength and represents a significant advantage of the present invention. The unreacted material consists mainly of a vitreous matrix which is X-ray-amorphous, containing some quartz and feldspar minerals which are assumed to have "survived" the heat treatment up till 1,200° C.

By reacting clay with alkali at around 100° C., zeolite can be produced in the form of a powder, which may be desirable in certain cases. In other cases, on the other hand, one will want the zeolite in the form of aggregates of a certain size, and this is achieved in the present invention by using expanded clay as the raw material Clay in itself has cation-exchanging properties, and these properties can be used in certain connections, but the use of clay in its original and unreacted form has several disadvantages which are overcome with the method described herein. In contact with water, most types of clay will first form a highly viscous, sticky mass and will disperse with the addition of more water so that the individual clay crystals become free particles of approx. 1–10 micrometers in the water. A suspension such as this cannot be filtered because the filter will clog. If one wishes to work with larger particles of clay, they will not have mechanical strength and will moreover cling to each other because of their sticky surface.

There are various methods known for producing zeolite in the form of larger particles, often in the range of 0.05 to 3 mm for use in various applications where that is desirable. For example, zeolite powder can be spray-dried together with a suitable binding material, often alumina or silica. These to particles usually attain a size of around 0.1 mm and are well-suited for use in processes requiring fluidized bed technology. Extruding a slurry with a binder is used to manufacture pellets in the 1-mm-range pellets commercially, and such pellets are used as drying agents and as a catalyst in various processes. Similar products can also be produced as described in, e.g., JP-723442 where zeolite particles, clay and polyacrylamide are mixed and the mixture is kneaded and sintered particles are produced in any desired form. For water purification purposes, a known process comprises the production of macroporous aggregates from small particles of fired clay (90%) and clinoptilolite zeolite (10%) which are stuck together (Oldenburg and Sekoulov, 1995). A limitation with all procedures involving sintering of zeolite together with a binder is that only zeolites that are stable at the sintering temperature can be used, and this excludes a number of the best ion exchangers which generally can only withstand being heated up to approx. 400° C. One way around this problem is to first produce a sintered aggregate of the desired components and then crystallize this to zeolite by treating it with alkali. Such sintered precursor materials usually consist of a mixture of silica and alumina without other substances present, and it is known that faujasite can be produced that way. Another known method of producing zeolite is by reacting so-called perlite with 15–20% alkali (M.G. Bottale et al. in "Informacion Tecnologica" Vol. 7 No, 6, 1996) for producing light, silica-rich particles (73% SiO2) with a relatively high content of the three zeolites: sodalite, faujalite and A-zeolite.

So-called light weight aggregate, in this case Fittralite™, in the form of whole or crushed particles made from expanded clay, is for the present invention used as the starting material for producing expanded ceramic zeolitic particles, because it mainly consist of Si and Al and are moreover cheap and posess an attractive physical shape. Light weight aggregate (ceramic particles in the form of sintered, light, expanded clay aggregates) has a set of attractive properties such as low specific gravity, macroporosity, great mechanical strength and low price, but it does not have cation-exchange properties and has relatively low specific surface which when measured with nitrogen adsorption is typically 1–2 $m^2/g$. Light weight aggregates consist mainly of a vitreous matrix which is X-ray-amorphous, containing some quartz and a little feldspar minerals assumed to have "survived" the heat treatment of up till 1200° C. The quartz and feldspar minerals are crystalline and can thus be identified with X-ray diffraction, but this method does not provide a basis for quantitative determination. Based on knowledge of the composition of the original marine clay, it is assumed that the sum of quartz and feldspar minerals comprises between 10 and 30 percent.

Expanded ceramic zeolitic particles (Filtralite™ zeolite) can be produced by reacting whole or crushed so-called Filtralite™ particles with NaOH solution which is at least 1 M or another alkaline solution such as, e.g., KOH at a temperature of more than 50° C. in, e.g., a Teflon container in an oven. The reaction time can be from 2 hours and up, but zeolite is demonstrable with X-ray diffraction only after approx. 16 hours. As known, however, crystals must have a certain size and comprise a certain amount before a crystalline substance is demonstrable with X-ray diffraction, and hence it can be reasonably assumed that the first trace of zeolite emerges already at the beginning of the crystallization, probably after approx. 2 hours. After the crystallization is deemed completed, the solid product is separated from the liquid phase by, e.g., decanting or filtration. The product is then washed in water, dried at 100° C. in an oven and then analyzed with X-ray diffraction which yields a diffraction pattern characteristic of the crystalline substances it contains, as long as the amounts are more than 1–2 percent and the crystals more than approx. 0.01 micrometer in diameter. The different zeolites are most easily identified by comparing with typical diffraction patterns as rendered in "Collection of simulated XRD powder patterns for zeolites" by M. M. J. Treacy, J. B. Higgins and R. von Ballmoos, 3rd. Ed. Elsevier, Amsterdam, 1996. The zeolite gismondine, or its so-called Na-P1 variant, has a diffraction pattern where the two most intense reflections arise at 2 theta=12.5 and 28.1 degrees when using CuKα radiation. Other strong reflections arise at 2 theta angles of approx. 5.0, 4.1, 3.2 and 2.7 degrees. The degree of uncertainty in the stated numbers is approx. 0.1, due in part to instrument variables and sample preparation and in part to variations in the composition of the different variants of this zeolite. Other zeolites are similarly identified, such as zeolite A, chabazite and merlionite. It is the total diffraction pattern which forms the basis for positive identification, as some reflections are common to several different zeolites. Consequently, both of the zeolites gismondine and merlionite have strong reflections at approx. 2 theta=12.5 degrees, and they are distinguished between by the aid of other characteristic reflections which do not overlap. Quantitative determination is not possible with X-ray diffraction, but a semi-quantitative determination is possible by comparing the intensity of a particular reflection in different tests. For gismondine, this is done by comparing the intensity of the 7.1 Å reflection which arises at 2 theta=12.5-degree angle.

The product Filtralite™ zeolite (expanded ceramic zeolitic particles) produced as described above consists of ceramic particles in the form of sintered, light, expanded clay aggregates partly converted to zeolite so that they may be described as zeolitic, macroporous ceramic particles with cation-exchange properties with a lower specific gravity than corresponding pure zeolite made from aggregates of expanded clay, taking into account that certain details of the process for producing this product are adapted to the type of raw material used. An entirely crucial feature of the invention is that the zeolite has grown into the expanded clay aggregates so that the product has properties from both the expanded clay and the zeolite at the same time, and the expanded ceramic zeolitic particles can thus be characterized as follows:

1. The expanded ceramic zeolitic particles contain crystalline zeolite formed in the producing process as the active component, and it is this crystalline zeolitic component that has cation-exchanging properties in addition to the fact that it has all other properties characteristic of zeolites.

2. Furthermore, the expanded ceramic zeolitic particles occur as beads or aggregates with a diameter of 1–10 mm which are microporous and macroporous at the same time, and which have a specific surface typically larger than 50 $m^2/g$ in addition to having high mechanical strength. The specific surface of the expanded ceramic zeolitic pellets is thus at least 25–50 times larger than for unreacted starting material: so-called Filtralite™.

These unique properties are achieved by choosing as raw material ceramic, macroporous aggregate produced by expanding clay with a certain organic content and firing it at 1,100–1,200° C. Thus it is the starting material which forms the matrix in which the zeolite is bound, and the combination of this matrix and the zeolite which comprises the expanded ceramic zeolitic particles. The matrix contains also some quartz and feldspar minerals which are assumed to have survived from the starting material, but these minerals are assumed to have minor significance with relation to the present invention, primarily because they do not appear to react chemically in the zeolitization process. It is thus assumed that parts of the Vitreous matrix is what reacts and forms zeolite, and this vitreous matrix has its origin in various clay minerals, among other components, which together comprise the main part of the marine clay used for producing expanded clay of the type Filtralite™ in Norway.

As previously pointed out, the process for crystallization of zeolite from raw material consisting of silica, alumina and alkali is in itself well known, and similar processes based on these three reagents and any other similar reagents such as, e.g., kaolin, are thus found repeatedly in numerous patents, but the procedure yields in many cases a product comprising a powder which is difficult to handle.

What is special about the expanded ceramic zeolitic particles (=light weight aggregate) is that by choosing it as the starting material, one obtains a product with unique properties well-suited for, e.g., certain applications relating to water purification, among other things. It is also because it is desireable to maintain the macroporous structure of the raw material in addition to the vitreous matrix as the "glue/backbone" that whole or crushed light weight aggregates have been chosen as the starting material. The present invention comprises specifically a process for producing a material with all of those properties in combination, and this is significant because materials not having all the said properties will not be so well-suited for the purposes for which this invention is intended. These purposes are outlined in the following.

APPLICATIONS: The zeolitic aggregates (expanded ceramic zeolitic particles) produced according to the invention have cation-exchanging properties and can be used in all cases where cation exchangers are used, and particularly in such cases where it is favourable with a specific gravity slightly above 1. Such an application can include water purification where in many cases it may be favourable with a cation exchanger that can be kept in suspension in the water masses without floating to the surface and without sinking to the bottom. If desired, this can be achieved for cation exchangers with a specific gravity insignificantly higher than water, by keeping the water mass in motion. The present invention comprises such a cation exchanger which has a specific gravity only insignificantly higher than water, and which besides its shape and particle size can easily be separated from the aqueous phase, and which will thus be better suited for special purification purposes than will other cation exchangers.

U.S. Pat. No. 4,344,851 teaches how zeolite of the phillipsite-gismondine type is used to selectively capture ammonium through ion exchange. Using zeolite for selectively capturing ammonium is a well-established technique, and the problem now is to find a zeolite that can do this efficiently. U.S. Pat. No. 4,522.727 also describes a zeolite-based system for removing ammonium, but in this patent, greater emphasis is placed on the technical aspects of the process. The problem is now to find the material among zeolites and other ion exchangers that does a given job in the best overall economic and environment-friendly way. Expanded clay will far from always be the best starting material for producing zeolites, because in many situations one will prefer, e.g., a fine and pure powder as a product, but in other situations there will be a need for a material in the form of relatively large particles with a relatively low specific gravity.

As cation exchangers, the expanded ceramic zeolitic particles produced according to the present invention can be used to capture ammonium and heavy metals from polluted water, be it strongly polluted water from agriculture or industry as effluent to a recipient, or slightly polluted water to be used as drinking water, for farm irrigation or as process water in industry. The present invention can be used for stripping polluted water of heavy metals in a purification plant, so that the mud that is produced in the purification plant can be used for agricultural purposes or the like. In addition, the invention can also be used to remove heavy metals and ammonium in aquariums and any container used for holding fish and fry, e.g., for transportation purposes.

Other applications are also conceivable. The expanded ceramic zeolitic pellets can also act as an excellent substrate for micro-organisms. A number of applications of the zeolite gismondine are cited in U.S. Pat. No. 4,980,323, 5,064,790 and 5,179,051, and applications of the zeolite analcime in U.S. Pat. No. 5,470,557.

The process for crystallizing zeolite from raw materials of silica, alumina and alkali is hence well known, and similar processes based on these three reagents and any other similar reagents thus appear in numerous patents, but, as stated before, the procedure usually yields in many cases a powder which is difficult to handle. What is unique about the present invention is that by choosing expanded clay as the starting material, a product is obtained which posesses unique propertiesis that are well-suited for certain applications relating to purification of water, soil and gas. It was not initially obvious that the particles of expanded clay were a suitable starting material for producing zeolite, because to produce zeolite it is generally considered advantageous to use reagents in in the form of powders or more preferably in dissolved form which promote faster crystallization, Furthermore, zeolite production will usually call for pure reagents that do not contain impurities such as Fe and Mg. Expanded clay aggregates of the type used in the present invention do contain a large quantity of Fe and Mg, and the material would not a priori have been expected to be a suitable raw material for producing zeolite. Furthermore, the Si and Al that is to form the lattice of the zeolite is bound in a vitreous matrix in the expanded clay, so its reaction with the added alkali would be expected to be strongly delayed. However, and perhaps surprisingly, these apparent problems with using expanded clay as raw material represent major advantagues when it comes to the overall properties and performance of the zeolitic product, because it is indeed desireable to preserve the macroporous structure of the original Filtralite™-particles as well as a part of the vitreous matrix as "glue/backbone" in the zeolitic product. So, with the present invention the advantagues of using a starting material which yields a less than 100% pure zeolite is materialized because the product has other extremely valuable properties in addition to containing the zeolitic cation exchanger. These other valuable properties comprise macroporosity, high physical strength, relatively low specific gravity and optional particle size in combination with the ion-exchanging properties. The present invention consists essentially of a material with all of those properties in combination, and this is important because materials that do not contain all the said properties are not as well suited for the purposes for which the invention is aimed at.

Having described the basic aspects of the invention, the following examples are given to illustrate specific embodiments and applications thereof:

EXAMPLE 1

Figure 1:
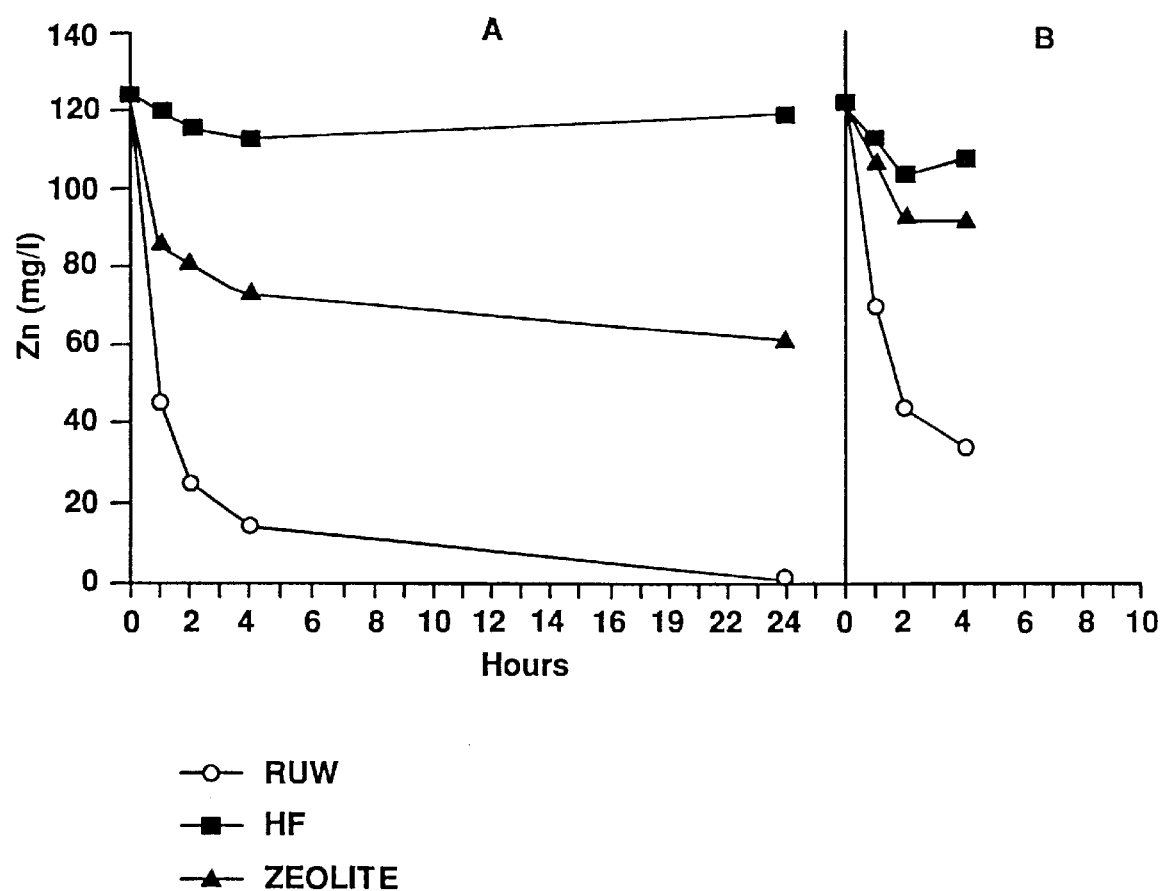
FIG. 1 is a plot of zinc concentration versus time for a zinc solution in contact with zeolite RUW, unreacted FILTRALITE (HF) and clinoptilolite (ZEOLITT). Part A is for unreacted RUW, FILTRALITE or clinoptilolite. Part B is for the same materials after the solution employed in Part A was poured off, and fresh zinc solution added.

Expanded ceramic zeolitic beads (Filtralite™ zeolite) were produced by reacting 5 g Filtralite™ beads with 12.5 g of 2M NaOH solution at 100° C. in a Teflon container in an oven. A sample was withdrawn after 18 days. The sample was washed in water, dried at 100° C. in an oven and then analyzed with X-ray diffraction which yielded a diffraction pattern characteristic of the zeolite gismondine in addition to quartz, Table 1

TABLE 1

(X-ray data)
Wavelength 1: 1.54056
Wavelength 2: 1.54439
Raw data measured from 2 theta = 3,000 to 40,000°
Step size: 0.020  Time/step: 1.0
Peak width: 0.200  Threshold: 1.0

| 2 theta | d | Cps | % |
|---|---|---|---|
| 10,811 | 8.1770 | 17.40 | 13.20 |
| 12,453 | 7.1017 | 55.46 | 42.10 |
| 13,332 | 6.6359 | 18.82 | 14.29 |
| 17,803 | 4.9779 | 22.37 | 16.98 |
| 20,837 | 4.2596 | 26.15 | 19.85 |
| 21,665 | 4.0986 | 29.77 | 22.60 |
| 22,953 | 3.8714 | 21.87 | 16.60 |
| 23,599 | 3.7669 | 19.18 | 14.56 |
| 25,600 | 3.4768 | 10.45 | 7.93 |
| 26,636 | 3.3439 | 131.74 | 100.00 |
| 27,471 | 3.2441 | 33.90 | 25.73 |
| 28,023 | 3.1815 | 52.62 | 39.95 |
| 28,287 | 3.1524 | 45.01 | 34.16 |
| 30,387 | 2.9391 | 30.10 | 22.85 |
| 32,693 | 2.7413 | 16.09 | 12.21 |
| 33,391 | 2.6813 | 25.21 | 19.14 |
| 36,523 | 2.4582 | 30.71 | 23.31 |

The rest of the Filtralite™ pellets were further reacted for an additional 50 days, after which the alkaline solution was poured off and the pellets were washed with distilled water before they were dried at 100° C. in an oven. The pellets were then analyzed with X-ray diffraction which gave a diffraction pattern showing that the zeolite gismondine is still the principal component among the crystalline compounds, but now with a higher intensity of the X-ray reflections characteristic of the zeolite gismondine. See Table 2.

TABLE 2

(X-ray data)
Wavelength 1: 1.54056
Wavelength 2: 1.54439
Raw data measured from 2 theta = 3,000 to 40,000°
Step size: 0.020  Time/step: 1.0
Peak width: 0.300  Threshold: 1.0

| 2 theta | d | Cps | % |
|---|---|---|---|
| 3,060 | 28.8490 | 76.00 | 55.88 |
| 10,728 | 8.2395 | 37.00 | 27.21 |
| 12,360 | 7.1552 | 111.00 | 81.62 |
| 13,789 | 6.4168 | 15.00 | 11.03 |
| 16,418 | 5.3946 | 21.00 | 15.44 |
| 17,700 | 5.0068 | 59.00 | 43.38 |
| 21,173 | 4.1927 | 20.00 | 14.71 |
| 21,548 | 4.1206 | 56.00 | 41.18 |
| 27,436 | 3.2481 | 41.00 | 30.15 |
| 27,904 | 3.1948 | 136.00 | 100.00 |
| 28,181 | 3.1640 | 59.00 | 43.38 |
| 33,257 | 2.6917 | 42.00 | 30.88 |

EXAMPLE 2

Filtralite™ zeolite with bead-shaped particles was produced by reacting 5 g of Filtralite™ beads with 12.5 g of 2M NaOH solution at 200° C. in a steel autoclave with a Teflon lining. A sample withdrawn after 18 days was washed in water, dried at 100° C. in an oven and then analyzed with the aid of X-ray diffraction which gave a diffraction pattern characteristic of the zeolite analcime, Table 3.

TABLE 3

(X-ray data)
Wavelength 1: 1.54056
Wavelength 2: 1.54439
Raw data measured from 2 theta = 3,000 to 40,000°
Step size: 0.020  Time/step: 1.0

Peak width: 0.300   Threshold: 1.0

| 2 theta | d | Cps | % |
|---|---|---|---|
| 3,040 | 29.0388 | 83.00 | 17.36 |
| 15,767 | 5.6160 | 264.00 | 55.23 |
| 18,238 | 4.8602 | 42.00 | 8.79 |
| 20,973 | 4.2323 | 34.00 | 7.11 |
| 22,419 | 3.9623 | 16.00 | 3.35 |
| 23,494 | 3.7835 | 42.00 | 8.79 |
| 24,242 | 3.6685 | 27.00 | 5.65 |
| 25,696 | 3.4640 | 37.00 | 7.74 |
| 25,955 | 3.4300 | 478.00 | 100.00 |
| 26,815 | 3.3219 | 50.00 | 10.46 |
| 27,526 | 3.2377 | 59.00 | 12.34 |
| 29,761 | 2.9995 | 41.00 | 8.58 |
| 30,522 | 2.9264 | 117.00 | 24.48 |
| 31,933 | 2.8003 | 20.00 | 4.18 |
| 33,270 | 2.6907 | 37.00 | 7.74 |
| 34,702 | 2.5829 | 26.00 | 5.44 |
| 35,813 | 2.5052 | 41.00 | 8.58 |
| 36,644 | 2.4503 | 19.00 | 3.97 |
| 37,075 | 2.4228 | 20.00 | 4.18 |

EXAMPLE 3–5

Several samples of Filtralite™ zeolite with bead-shaped particles were producted by reacting 5 g of expanded clay (Filtralite™ pellets) that have been sandblasted to remove part of the hard surface layer, with 12.5 g of 2 M NaOH solution at 100° C. in a Teflon container, according to Table 5. Samples were withdrawn after 6 and 14 days. The samples were washed in water, dried at 100° C. in an oven and then analyzed with X-ray diffraction which gave a diffraction pattern which in all cases showed that zeolite had been formed in the pellets. The products consist of either of one of zeolites gismondine or merlionite or mixtures of the two as shown in Tables 5. In addition to zeolite, there are unreacted quartz and insignificant amounts of felspar from the starting material. The amount of zeolite has not been quantified, but it clearly increases with time from 6 to 14 days.

It appears that the use of KOH favours the formation off the zeolite merlionite, while the use of NaOH tends to yield gismondine.

TABLE 5

| Example no. | Sample | Alkaline solution | Temperature | Product after 6 days' cryst. | Product after 14 days' cryst. |
|---|---|---|---|---|---|
| 3 | sandblasted Filtralite ™ | 2M NaOH | 100° C. | merlionite + gismondine + quartz | merlionite + gismondine |
| 4 | sandblasted Filtralite ™ | 4M NaOH | 100° C. | gismondine + quartz | gismondine |
| 5 | sandblasted Filtralite ™ | 2M KOH | 100° C. | merlionite + quartz | merlionite |

EXAMPLES 6–11

A set of samples of eolite Filtralite™ in the form of a material comprising irregular particles with a very porous surface was produced in two steps. First the pellets of expanded clay (Filtralite™ pellets) were crushed and sieved so that the relatively dense, hard surface layer was broken up. Then 5 g of the crushed material was reacted with 12.5 g of 2M Naoh solution at 100° C. in a Teflon container, according to Table 6. The various samples of crushed material had in part different particle sizes, and they were in part exposed to different pre-treatment as shown in Table 6. Samples were withdrawn after 6 days. The samples were washed in water, dried at 100° C. in an oven and then analyzed with X-ray diffraction which gave a diffraction pattern which in all cases showed that more or less zeolite was formed.

TABLE 6

| Example no. | Type of sample | Pre-treatment | Product (main components) after 6 days' crystallisation |
|---|---|---|---|
| 6 | crushed < 70 mesh | None | gismondine + quartz |
| 7 | crushed 35–70 mesh | None | gismondine + quartz |
| 8 | crushed 15–35 mesh | None | gismondine + quartz |
| 9 | crushed 15–35 mesh | Aged for 24 hours in alkaline solution before heating commenced | gismondine + quartz |
| 10 | crushed 15–35 mesh | Washed in alkali for 24 hours in 28 and 2 M NaOH | gismondine + quartz |
| 11 | crushed 15–35 mesh | Washed in acid for 24 hours in 12% HCl | gismondine + quartz |

The products in all examples consist of the zeolite gismondine in addition to varying amounts of unreacted quartz, as shown in Table 6. The amount of zeolite have not been quantified, but from the intensity of the X-ray reflections, it appears to be nearly independent of the different variations made in these examples.

EXAMPLE 12

Another sample of Filtralite™ zeolite in the form of a material consisting of irregular particles with a very porous surface was produced by reacting 5 g of a so-called "high tensile" quality of expanded clay aggregates crushed and sieved to to 0.5–0.6 mm with 12.5 g of 2M NaOH solution at 100° C. in a Teflon container in an oven. A sample was withdrawn after 38 hours. The sample was washed, dried at 100° C. in an oven and then analyzed with X-ray diffraction which gave a diffraction pattern characteristic of the zeolite gismondine, and additionally quartz. See Table 7.

TABLE 7

(X-ray data)
Wavelength 1: 1.54056
Wavelength 2: 1.54439
Raw data measured from 2 theta = 3,000 to 40,000°
Step size: 0.020   Time/step: 1.0
Peak width: 0.200   Threshold: 1.0

| 2 theta | d | Cps | % |
|---|---|---|---|
| 10,773 | 8.2054 | 12.03 | 4.74 |
| 12,394 | 7.1357 | 45.11 | 17.75 |
| 17,774 | 4.9862 | 19.06 | 7.50 |
| 20,807 | 4.2656 | 49.54 | 19.50 |
| 21,639 | 4.1035 | 21.52 | 8.47 |
| 26,588 | 3.3498 | 254.13 | 100.00 |
| 27,483 | 3.2428 | 38.26 | 15.06 |
| 28,016 | 3.1822 | 49.23 | 19.37 |
| 36,493 | 2.4601 | 28.01 | 11.02 |
| 39,396 | 2.2853 | 19.37 | 7.62 |

The rest of the material was further reacted for 47 hours, after which the alkaline solution was poured off and the particles washed with distilled water before they were dried at 100° C. in an oven. The particles were then analyzed with X-ray diffraction which gave a diffraction pattern characteristic of the zeolite gismondine, rendered In Table 8. There were additionally traces of other crystalline compounds such as quartz and feldspar. A comparison of the intensities of the X-ray reflections in Tables 7 and 8 which are characteristic for gismondine shows that the crystallinity, or amount of zeolite, has not increased appreciably during the period after the initial 38 hours.

TABLE 8

(X-ray data)
Wavelength 1: 1.54056
Wavelength 2: 1.54439
Raw data measured from 2 theta = 3,000 to 40,000°
Step size: 0.020  Time/step: 1.0
Peak width: 0.200  Threshold: 1.0

| 2 theta | d | Cps | % |
| --- | --- | --- | --- |
| 3,040 | 29.0388 | 51.00 | 20.73 |
| 10,805 | 8.1814 | 19.00 | 7.72 |
| 12,424 | 7.1183 | 46.00 | 18.70 |
| 16,465 | 5.3793 | 11.00 | 4.37 |
| 17.760 | 4.9899 | 22.00 | 8.94 |
| 20,815 | 4.2640 | 49.00 | 19.92 |
| 21,667 | 4.0982 | 27.00 | 10.98 |
| 25,564 | 3.4816 | 49.00 | 19.92 |
| 26,605 | 3.3477 | 246.00 | 100.00 |
| 28,053 | 3.1781 | 62.00 | 25.20 |
| 32,001 | 2.7945 | 10.00 | 4.07 |
| 33,456 | 2.6762 | 16.00 | 6.50 |
| 36,532 | 2.4576 | 24.00 | 9.76 |
| 39,429 | 2.2834 | 22.00 | 8.94 |

EXAMPLE 13–15

Several samples of Filtralite™ zeolites were produced in the same way as described in example 12, but the composition of the alkaline solultion was varied according to Table 9.

TABLE 9

| Example | Alkaline solution | Product after 38 h | Product after 61 h |
| --- | --- | --- | --- |
| 13 | 1.5M NaOH | gismondine + quartz | gismondine + quartz |
| 14 | 1M NaOH | quartz | gismondine + quartz |
| 15 | 2M NaOH + 2.4 g NaAlO2 | gismondine + chabazite + quartz | gismondine + chabazite + quartz |

The results show that by using 1.5 M NaOH, one obtains equally crystalline gismondine after 38 hours as with 2 M NaOH, while with 1 M NaOH, the crystallization to zeolite proceeds mom slowly. By adding alumlnium in the form of NaAlO2 dissolved in the alkali the zeolite chabazite is formed in addition to the zealite gismondine. Table 10 below shows the X-ray reflections from the product in example 15 after 38 hours.

TABLE 10

(X-ray data)
Wavelength 1: 1.54056
Wavelength 2: 1.54439
Raw data measured from 2 theta = 3,000 to 40,000°
Step size: 0.020  Time/step: 1.0
Peak width: 0.200  Threshold: 1.0

| 2 theta | d | Cps | % |
| --- | --- | --- | --- |
| 9,372 | 9.4289 | 24.27 | 10.73 |
| 12,390 | 7.1382 | 18.15 | 8.03 |
| 12,782 | 6.9198 | 16.22 | 7.17 |

TABLE 10-continued (X-ray data)
Wavelength 1: 1.54056
Wavelength 2: 1.54439
Raw data measured from 2 theta = 3,000 to 40,000°
Step size: 0.020  Time/step: 1.0
Peak width: 0.200  Threshold: 1.0

| 2 theta | d | Cps | % |
| --- | --- | --- | --- |
| 13,719 | 6.4494 | 8.51 | 3.76 |
| 17,619 | 5.0295 | 14.61 | 6.46 |
| 20,487 | 4.3315 | 24.32 | 10.75 |
| 20,805 | 4.2660 | 52.13 | 23.05 |
| 21,104 | 4.2061 | 13.74 | 6.07 |
| 21,884 | 4.0580 | 13.44 | 5.94 |
| 25,789 | 3.4517 | 13.85 | 6.12 |
| 26,354 | 3.3790 | 16.03 | 7.09 |
| 26,594 | 3.3490 | 226.17 | 100.00 |
| 27,495 | 3.2414 | 36.41 | 16.10 |
| 27,708 | 3.2169 | 46.71 | 20.65 |
| 27,972 | 3.1872 | 34.37 | 15.20 |
| 30,452 | 2.9330 | 29.71 | 13.14 |
| 30,831 | 2.8978 | 19.29 | 8.53 |
| 36,497 | 2.4598 | 32.36 | 14.31 |
| 39,405 | 2.2848 | 18.01 | 7.96 |

EXAMPLE 16

A more than 100 times larger batch of Filtralite™ zeolite was produced essentially according to the procedure stated In example 12, but with a significantly lower ratio between amount of alkaline solution and Filtralite™ particles, by reacting 665 g of a so-called "high tensile" quality of expanded clay crushed and sieved to 0.5–1.6 mm with 600 g of 2M NaOH solution at 100° C. in a Teflon container in an oven.

An analysis of the end product after 38 hours showed that it had a composition essentially equal to, and not significantly different from, the product produced according to example 12. The specific surface of this sample was measured by two different methods. 1-point BET measurement with "Sorptomatic 1800" yielded 61 m$^2$/g, while full isotherm measured with an instrument from Carlo Erba yielded 74 m$^2$/g. Nitrogen was used as an adsorbate in both measurements.

EXAMPLE 17

In an attempt to avoid boiling in liquid alkaline solution, a new sample of Filtralite™ zeolite was produced by filling 93.2 g of the same irregular particles as used in examples 12 and 16 in a 125-ml Teflon container together with 53 g of 2M NaOH solution. This amount of solution was entirely absorbed in the macroporous particles by shaking the container and turning it upside down a few times, so that its appearance became like moist sand without free liquid between the particles. The container was placed in an oven at 100° C. and a sample was withdrawn after 40 hours. The sample was washed in water, dried at 100° C. in an oven and then analyzed with X-ray diffraction which yielded a diffraction pattern characteristic of the zeolite gismondine and in addition unreacted quartz as well as possible traces of other compounds, including feldspar, i.e. a composition essentially equal to, and not significantly different from, the product produced according to examples 12 and 16.

EXAMPLE 18

In an attempt to produce Filtralite™ zeolite with another type of zeolite, expanded clay consisting of a mixture of 95% of the regular marine clay used to make regular Filtralite™ and 5% Cornwall kaolin (kaolin is much used to make A-zeolite), was used as the starting material. These pellets of expanded clay aggregates were crushed and sieved, and a fraction of between 10 and 35 mesh was taken out, 8.85 g of this fraction with 12.5 g of 2M NaOH-solution added was then placed in an oven at 100° C. in a, Teflorn container. A sample was withdrawn after 38 hours, The sample was washed in water, dried at 100° C. in an oven and then analyzed with X-ray difiraction, which yielded a difiraction pattern characteristic of the zeolite gismondine in addition to quartz, but the intensity of the reflections which are characteristic for gismondine are somewhat lower than what was found after 38 hours in example 12. The rest of the particles were further reacted. A new sample was withdrawn after 88 hours and the intensity of the reflections which is characteristic of gismondine is somewhat higher than what was found after 85 hours in example 12. There was no trace of zeolites other than gismondine in any of the analyzed samples.

EXAMPLE 19

To check the significance of particle size on the speed of formation of zeolite, a fraction of crushed Filtralite™ with particles larger than those that were used in examples 12–17 was produced by using particles with a diameter of 1–3 mm, and 50 g of 2M NaOH solution was added to 50 g of particles In a Teflon container which was then placed in an oven at 100° C. A sample was withdrawn after 16 hours and analyzed with XRD. The sample showed a definite content of gismondine, but the intensity of the gismandine's most intense reflection was only approx. ⅓ of what was achieved after 38 hours in example 12. A new sample was withdrawn after 38 hours and In this sample the intensity of the most intense reflection of gismondine was approx, 10% higher than what was achieved in example 12, but this difference is not significant.

EXAMPLE 20

The washed and dried product from example 2, second sample, was tested for water purification with phosphate and ammonium content 1.76 g zeolitized Filtralite™ pellets were added to 100 ml 0.01 M solution of $(NH_4)_2HPO_4$ and placed in a 100-ml PE bottle and mounted on a shaking device. The bottle was shaken at "speed 3" at room temperature for 20 hours. Then, the solid substance and solution were separated by filtration (black ribbon). The results in Table 11 below show that recrystallized Filtralite™ (analcime) is an excellent adsorbent for ammonium, i.e. an excellent cation exchanger.

EXAMPLE 21

Comparative example, Testing of regular, unreacted Filtralite™ particles for puriyng water containing phosphate and ammonium. 1.76 g of the material was added to 100 ml 0.01 M solution of $(NH_4)_2HPO_4$ and placed in a 100-ml PE container and mounted on the same shaking device as in example 20. The container was shaken at speed 3 at room temperature for 20 hours. Solid matter and solution were then separated by filtration (black rlbbon). The results in Table 11 below demonstrate that unreacted Filtralite™ adsorbs a certain amount of phosphate, but very Iftile ammonium. Table 11 shows the amount of ammonium and phosphate bound to zeolitized and unreacted pellets of expanded clay.

TABLE 11

| Sample | $NH_4$-ads (mg/g) | $PO_4$-ads (mg/g) |
| --- | --- | --- |
| Basic solution | 0 | 0 |
| 1.76 g unreacted Filtralite ™ | 0.1 | 0.4 |
| 1.76 g recryst. Filtralite ™ from Example 2. | 2.3 | 0 |

EXAMPLE 22

The application of Filtralite™ zeolite for adsorption of heavy metals from water, exemplified with zinc. The experiment was carried out by placing 2 ml of Filtralite™ zeolite produced according to example 16 in a 150-ml Erlenmeyer flask. 100 ml 2 mM Tris with 1.130 g/l $Zn(NO_3)_2 \times 6H_2O$ was added, i.e. 124 mg Zn per litre. The flask was mounted on a shaking device at 160 rpm and samples were withdrawn after 1, 2, 4 and 23 hours. After sampling after 23 hours, the solutions were poured off and a new 100 ml of fresh Zn-containing solution was added. Samples were then withdrawn after 1, 2 and 4 hours. Zn was determined using Dr. Lange CADAS 30 Photometer and: a "Zn 360" analysis kit.

TABLE 12

| Contact time (hours) | Zinc concentration (mg/l) |
| --- | --- |
| 1 | 45 |
| 2 | 25 |
| 4 | 14 |
| 23 | 2 |

The old solution was poured off and a new 100 ml of 2 mM tris with 1.130 g/l zinc nitrate hexahydrate was added. Samples were withdrawn after 1, 2 and 4 hours.

| 1 | 72 |
| --- | --- |
| 2 | 46 |
| 4 | 37 |

The results am also shown in FIG. 1, where the term RUW is used for Filtralite™ zeoilite.

EXAMPLE 23

Comparative example. An adsorption experiment was conducted exactly as described in example 22, but the particles that were used were unreacted high tensile Filtralite™, without zeolite, content. After 1, 2, 4 and 23 hours of contact time the zinc concentration was in solution as indicated in Table 13 below.

TABLE 13

| Contact time (hours) | Zinc concentration (mg/l) |
| --- | --- |
| 1 | 120 |
| 2 | 116 |
| 4 | 113 |
| 23 | 121 |

The old solution was poured off and a new 100 ml of 2 mM tris with 1.130 g/l zinc nitrate hexahydrate was added. Samples were withdrawn after 1, 2 and 4 hours.

| | |
|---|---|
| 1 | 115 |
| 2 | 106 |
| 4 | 110 |

The results are also shown in FIG. 1, where the term HF is used for this material. The results show that the original unreacted material is significantly poorer than the Filtralite™ zeolite as adsorbent for zinc, and it can hardly be said to adsorb zinc at all.

EXAMPLE 24

Comparative example. An adsorption experiment was carried out exactly as described in example 22, but the particles that were used were 1–3 mm chips of a clinoptilolitic rock from Michailovice, Slovakia (Clinoptilolite is a naturally occurring zeolite widely used for purification purposes). After 1, 2, 4 and 23 hours of contact time, the zinc concentration in the solution was as shown in Table 14 below.

TABLE 14

| Contact time (hours) | Zinc concentration (mg/l) |
|---|---|
| 1 | 86.5 |
| 2 | 81.5 |
| 4 | 73.5 |
| 23 | 63.5 |

The old solution was poured off and a new 100 ml of 2 mM tris with 1.130 g/l zinc nitrate hexahydrate was added. Samples were withdrawn after 1, 2 and 4 hours.

| | |
|---|---|
| 1 | 109 |
| 2 | 95 |
| 4 | 94 |

The results are also shown in FIG. 1 where the term "ZEOLITT" is used for the clinopilolite. The results showed that this material is performing significantly worse than the Filtralite™ zeolite as an adsorbent for zinc.

I claim:

1. Zeolitic cation exchangers consisting of expanded ceramic zeolitic pellets with macro- and microporosity, wherein said zeolitic cation exchangers consist of sintered, expanded clay aggregates having a diameter in the range of 1–10 mm which are partly transformed to zeolites selected from gismondine, analcime and chabazite, by means of hydrothermal treatment with an alkaline solution for a period of two hours or more at a temperature of between 50 and 300 degrees Celsius.

2. A procedure for producing zeolitic cation exchangers consisting of expanded ceramic, zeolite pellets with macro- and microporosity, from sintered, expanded clay aggregates having a diameter of 1–10 mm, wherein said aggregates are treated hydrothermally for a period of at least 2 hours at a temperature of between 50 and 300 degrees Celsius with an alkaline solution which is added only in the expanded aggregates' pores so that the volume between the aggregates is without liquid during the treatment.

3. The procedure of claim 2, wherein the expanded clay aggregates are based on clay containing illite.

* * * * *